UNITED STATES PATENT OFFICE.

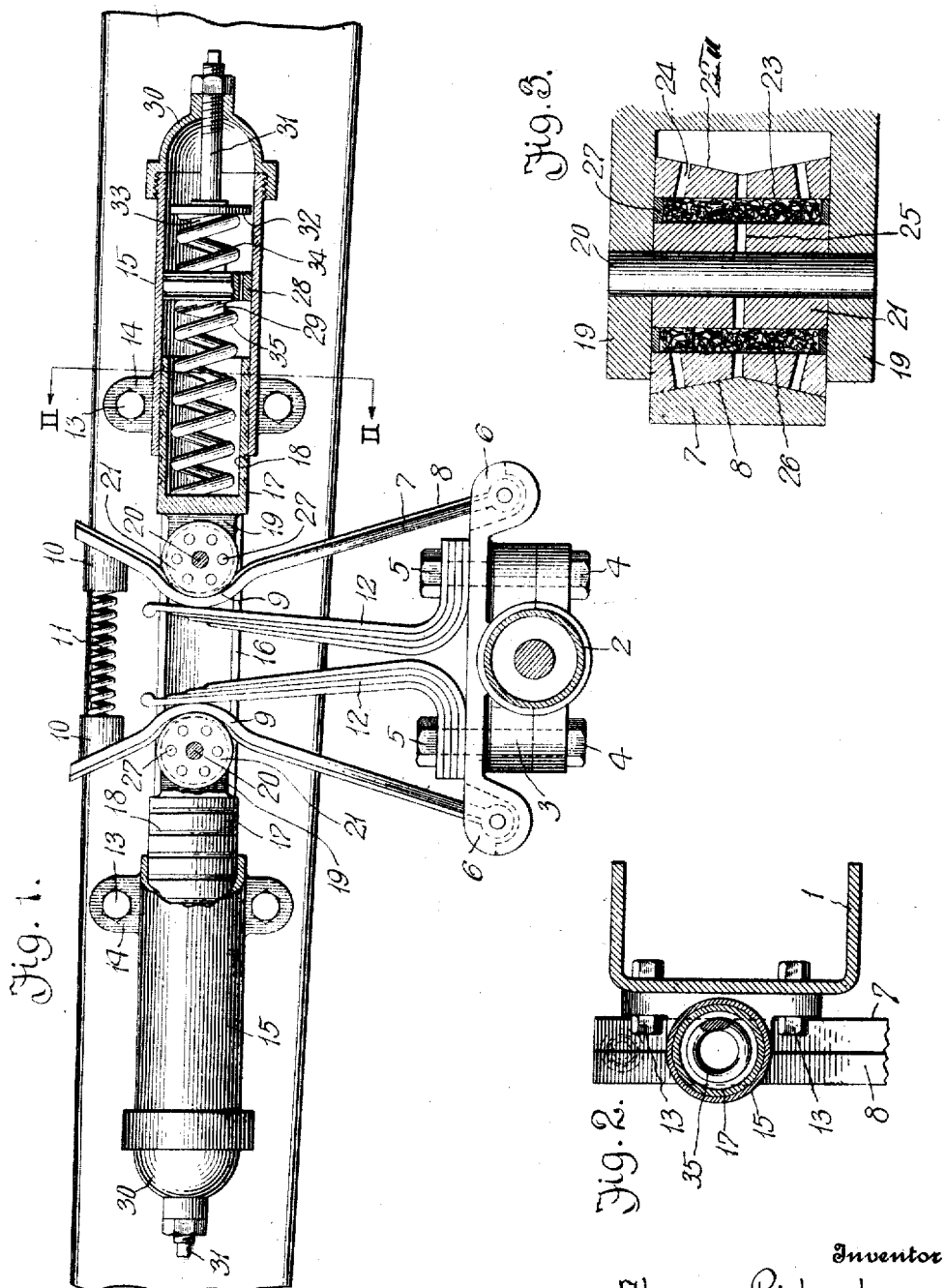

THOMAS RICHARDSON, OF MANISTEE, MICHIGAN

SPRING SUSPENSION FOR VEHICLES.

1,262,845.  Specification of Letters Patent.  Patented Apr. 16, 1918.

Application filed December 29, 1916. Serial No. 139,659.

*To all whom it may concern:*

Be it known that I, THOMAS RICHARDSON, a subject of the King of Great Britain, residing at Manistee, in the county of Manistee and State of Michigan, have invented certain new and useful Improvements in Spring Suspensions for Vehicles, of which the following is a specification, reference being had therein to the accompanying drawings.

This invention relates to a spring suspension for vehicles and has special reference to a shock absorbing or cushioning device that may be used in conjunction with the ordinary springs of a vehicle, such as an automobile, or may be used entirely independent of the usual springs for supporting and cushioning a vehicle body relative to the chassis or running gear thereof.

The primary object of my invention is to provide a yieldable support for a vehicle body that includes primary and secondary cushioning means, the primary means compensating for jars and vibrations incurred by ordinary travel upon comparatively smooth streets and roads in contradistinction to rough streets or roads, and the secondary cushioning means is brought into play when excessive jars and vibrations are incurred by rough traveling.

The primary cushioning means includes opposed cylinders provided with pistons and resisting a compression or inward stroke of the pistons are springs and a liquid which is caused to flow through certain of the pistons before the secondary cushioning means is brought into action. The secondary cushioning means includes laminated springs adapted to resist pivoted members disposed to operate the primary cushioning means.

A further object of my invention is to combine primary and secondary cushioning means for a vehicle body wherein the parts are assembled with a view of reducing the cost of manufacture and at the same time retain those features by which durability, simplicity of construction and ease of assembling are secured, and with such ends in view, my invention resides in the novel construction, combination and arrangement of parts to be hereinafter specifically described and then claimed.

Reference will now be had to the drawing, wherein—

Figure 1 is a side elevation of the spring suspension, partly broken away and partly in section;

Fig. 2 is a cross sectional view taken on the line II—II of Fig. 1, looking in the direction of the arrows; and Fig. 3 is an enlarged horizontal sectional view of a rotatable roller.

In describing my invention by aid of the views above referred to, I desire to point out that the same are merely illustrative of a mechanical construction by which my invention may be put into practice, and I do not care to confine myself to the precise construction and arrangement of parts shown. The following description is therefore to be broadly construed as including such substitute constructions and arrangement of parts as are the obvious equivalent of those to be hereinafter referred to.

In the drawing, 1 denotes a portion of the vehicle frame, body or support movably held relative to a rear axle casing 2, and clamped or otherwise fixed upon this rear axle casing is a bracket 3 that serves functionally as a spring perch. The bracket 3 may be held by bolts 4, nuts 5 or other fastenings means and the ends of the brackets are provided with apertured ears 6. Pivotally mounted between the apertured ears 6 of the bracket 3 are inclined members 7 having outer ridge shaped or beveled faces 8. Contiguous to the upper ends of the members 7 are curved seat portions 9 and the extreme ends of said members have the confronting faces thereof provided with sockets or cups 10 to receive the end convolutions of a compression spring 11, said spring holding the members 7 normally separated for a purpose that will hereinafter appear.

Arranged between the members 7 are laminated compression members 12 having the upper ends thereof engaging the outer faces of the seat portions 9 of the members 7, and the lower ends thereof held on the bracket 3 by the bolts 4 and the nuts 5.

Connected to the outer side of the frame 1 by screw bolts 13 or other fastening means are the apertured ears 14 of longitudinally alining opposed cylinders 15. As a matter of economical construction, these cylinders may be made of a piece of tubing with the intermediate portions thereof, slotted, as at 16, so that the inclined members 7 and the compression members 12 may extend upwardly between confronting open ends of the cylinders 15.

Slidable in the confronting open ends of the cylinders 15 are outer cupped pistons 17 having suitable packing rings or lubricant grooves 18. The outer closed ends of the pistons 17 are provided with bearings or apertured ears 19 for transverse pins 20 and rotatable upon said pins are sheaves or anti-frictional rollers 21. Each roller has a peripheral V-shaped groove 22 to receive the outer beveled face of an inclined member 8, the inclined member being held against the roller 21 by a compression member 12 and the spring 11. Each roller has a plurality of circumferentially arranged longitudinally disposed pockets 23 in communication with ports 24 and 25, the former extending to the periphery of the roller and the latter extending to the pin 20. Felt or other lubricant holding material 26 is placed in the pockets 23 and the ends of the pockets closed by pieces of cork 27 or other suitable plugs. From time to time a lubricant can be placed in the pockets 23 to insure a non-frictional rotation of the roller on the pin 20 and a non-frictional contact of the periphery of the roller with the beveled face of the inclined member 8.

Slidable in the cylinder 16 are inner ported pistons 28 having the ends thereof provided with guides or studs 29.

The outer ends of the cylinders 15 are provided with detachable caps 30 and adjustably in said caps are spring tensioning stems 31 having heads 32 within the cylinders. The heads 32 have guides or studs 33 and interposed between the heads 32 and the pistons 28 are coiled compression springs 34, while similar springs 35 of greater length are interposed between the pistons 28 and the closed outer ends of the pistons 17. The detachable caps 30 permit of a suitable lubricant being placed in the cylinders 15 to insure an easy movement of the pistons 17 and 28 therein, and with the pistons 28 ported the lubricant may flow from one end of the cylinder to the opposite end thereof.

The elements 15 to 35 inclusive constitute primary cushioning means, in conjunction with the inclined members 7, for the frame 1 or the vehicle body supported thereby. The primary cushioning means have the action of dash-pots in resisting an opening or spreading movement of the inclined members 7, and assuming that a vehicle provided with a spring suspension is traveling on a smooth street or road, the springs 34 and 35, and pistons 28 and 17 coöperate in cushioning the usual jars and vibrations of the frame 1. Any downward movement of the frame 1 causes the anti-frictional rollers 21 to leave the seat portions 9 of the inclined members 7 and travel down said members, but slight jars or vibrations are not sufficient to effect the compression members 12, consequently the outer pistons 17 will yield, and transfer the jars or vibrations to the springs 35 and 34.

When rough and irregular roads are encountered which will subject the frame 1 to excessive jars and vibrations, the compression members 12 are brought into action to resist a closing or inward movement of the retaining members 7 as the anti-frictional rollers 21 travel down the inclined faces thereof. When subjected to successive jars and vibrations, and the anti-frictional rollers start to travel down the members 7, the outer pistons 17 are first shifted into engagement with the inner pistons 28, with the springs under compression, and the lubricant or oil within the cylinders 15 is caused to travel from one side of the pistons 28 to the opposite side, thus having a dash-pot effect before the compression members 12 are brought into action to resist further movement of the members 7 toward each other.

What I claim is:—

1. In a spring suspension, a bracket adapted for attachment to a rear axle casing, inclined members pivotally connected to said bracket, cylinders adapted for attachment to a vehicle frame and adapted to contain oil, inner pistons in said cylinders adapted to have movement thereof resisted by the oil in said cylinders, primary cushioning means supported by said cylinders engaging the outer sides of said inclined members and adapted to engage said inner pistons, and a secondary cushioning means carried by said bracket and engaging the inner sides of said inclined members.

2. In a spring suspension, cylinders adapted for attachment to a vehicle frame, inclined members extending between the confronting ends of said cylinders and adapted to be supported relative to a rear axle casing, cushioning means in said cylinders normally engaging the outer sides of said inclined members and successively brought into action to resist a spreading movement of said inclined members, and cushioning means between said inclined members retaining said members in engagement with the first mentioned cushioning means.

3. In a spring suspension, a bracket adapted to be supported by a vehicle chassis, pivoted members carried by said bracket, cylinders adapted for attachment to a vehicle frame, anti-frictional rollers engaging the outer sides of said members, yieldable means in said cylinders supporting said anti-frictional rollers, and leaf springs having the lower ends thereof on said bracket and the upper ends thereof extending between said members and holding said members normally in engagement with said anti-frictional rollers.

4. In a spring suspension, a bracket adapted for attachment to a vehicle chassis, pivoted inclined members carried by said bracket, cylinders adapted for attachment to a vehicle frame and adapted to carry oil, spring pressed pistons in said cylinders co-operating with the oil therein in providing a dash pot action, anti-frictional rollers carried by some of said pistons and engaging said inclined pivoted members, and means carried by said bracket between said members and adapted to resist the movement of said members toward each other.

5. In a spring suspension, a bracket adapted for attachment to a vehicle chassis, inclined members carried by said bracket, cylinders adapted for attachment to a vehicle frame, inner and outer spring pressed pistons in said cylinders with said outer pistons disposed to engage said inner pistons, anti-frictional lubricated rollers carried by the outer pistons of said cylinders and engaging said inclined members, and means between said members adapted to resist a movement of said members toward each other.

6. In a spring suspension, the combination with a rear axle casing and a vehicle frame movable relative thereto, of a bracket mounted on said rear axle casing, pivoted inclined members carried by said bracket, opposed cylinders connected to said vehicle frame and adapted to carry oil, inner and outer spring pressed pistons in said cylinders with the inner pistons ported to allow oil to flow from one side thereof to the other side, anti-frictional rollers carried by the outer pistons and engaging said inclined members, means between said members holding said members normally in engagement with said rollers, and cushioning means between said members brought into action after movement of said pistons to resist movement of said members toward each other.

In testimony whereof I affix my signature in the presence of two witnesses.

THOMAS RICHARDSON.

Witnesses:
JOHN AUSTIN,
ROSALIE J. GOLDSBOROUGH.